(12) United States Patent
Kenny

(10) Patent No.: US 7,686,392 B2
(45) Date of Patent: Mar. 30, 2010

(54) VEHICLE SEAT COVER

(75) Inventor: Kevin Brian Kenny, Cleveland, MO (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/496,296

(22) Filed: Jul. 31, 2006

(65) Prior Publication Data
US 2007/0040426 A1 Feb. 22, 2007

Related U.S. Application Data

(60) Provisional application No. 60/704,842, filed on Aug. 2, 2005.

(51) Int. Cl.
*A47C 31/11* (2006.01)
*A47C 7/62* (2006.01)

(52) U.S. Cl. .............. 297/229; 297/228; 297/228.1; 297/228.12; 297/228.13; 297/188.06; 297/188.2

(58) Field of Classification Search ........... 297/228, 297/228.1, 228.11, 228.12, 228.13, 188.01, 297/188.03, 188.04, 188.06, 188.2, 229
See application file for complete search history.

(56) References Cited

U.S. PATENT DOCUMENTS

| | | | | |
|---|---|---|---|---|
| 1,933,372 A | * | 10/1933 | Fisher | 297/228 X |
| 2,223,532 A | * | 12/1940 | Sallop | 297/188.06 X |
| 3,479,085 A | * | 11/1969 | Weinstein | 297/228.1 |
| 3,695,692 A | * | 10/1972 | Williams | 297/229 |
| 4,134,616 A | * | 1/1979 | Christensen | 297/188.2 |
| 4,400,030 A | * | 8/1983 | Maruzzo et al. | 297/228.1 |
| 4,669,779 A | | 6/1987 | Kaganas et al. | 297/229 |
| 4,676,549 A | | 6/1987 | English | 297/224 |
| 4,693,511 A | | 9/1987 | Seltzer et al. | 297/219 |
| 4,927,209 A | | 5/1990 | Maruyama | 297/180 |
| 4,958,886 A | | 9/1990 | Barattini et al. | 297/229 |
| 5,005,901 A | | 4/1991 | Hinde | 297/229 |
| 5,150,947 A | | 9/1992 | Croshaw | 297/229 |
| 5,265,933 A | | 11/1993 | Croshaw | 297/228.1 |
| 5,330,251 A | * | 7/1994 | McGuire | 297/229 |
| 5,403,066 A | | 4/1995 | Drum | 297/219.1 |
| 5,474,325 A | | 12/1995 | Daines et al. | 280/728.3 |
| 5,542,691 A | | 8/1996 | Marjanski et al. | 280/728.2 |
| 5,556,129 A | | 9/1996 | Coman et al. | 280/730.2 |
| 5,564,739 A | | 10/1996 | Davidson | 280/736 |
| 5,568,936 A | | 10/1996 | Spilker et al. | 280/728.2 |
| 5,588,671 A | | 12/1996 | Boumarafi et al. | 280/730.2 |
| 5,618,082 A | | 4/1997 | Jachmich | 297/229 |
| 5,655,813 A | | 8/1997 | Kirkpatrick | 297/220 |

(Continued)

FOREIGN PATENT DOCUMENTS

AT 405632 10/1999

(Continued)

*Primary Examiner*—Rodney B White

(57) ABSTRACT

Disclosed is an improvement in a bucket seat cover, which permits the functionality of seat-integrated seat belts and seat-attached armrests, which comprises: a vehicle seat cover of a type and size adequate to cover both the front of a vehicle seat and the back of a vehicle seat, characterized by elastic lined pass-through openings in the shoulder and hip area, connected by a zipper or other separation means to permit the transverse of seat-integrated seat belts, and, optionally incorporating additional openings on side panels, behind zipper, for transverse of seat-attached armrests.

48 Claims, 2 Drawing Sheets

U.S. PATENT DOCUMENTS

| | | | | |
|---|---|---|---|---|
| 5,682,771 | A | 11/1997 | Forest et al. | 66/198 |
| 5,707,107 | A * | 1/1998 | Melone | 297/228.1 |
| 5,806,925 | A * | 9/1998 | Hanley | 297/229 |
| 5,810,389 | A | 9/1998 | Yamaji et al. | 280/730.2 |
| D400,043 | S | 10/1998 | Rosenberg | D6/611 |
| D400,044 | S | 10/1998 | Rosenberg | D6/611 |
| 5,860,673 | A | 1/1999 | Hasegawa et al. | 280/730.2 |
| 5,893,579 | A | 4/1999 | Kimura et al. | 280/730.2 |
| 5,899,489 | A | 5/1999 | Jost | 280/730.2 |
| 5,927,749 | A | 7/1999 | Homier et al. | 280/730.2 |
| 5,957,528 | A * | 9/1999 | Campbell | 297/228.12 |
| 5,967,546 | A | 10/1999 | Homier et al. | 280/730.2 |
| 5,967,603 | A | 10/1999 | Genders et al. | 297/216.13 |
| 5,971,487 | A * | 10/1999 | Passehl | 297/228.1 X |
| 5,975,618 | A | 11/1999 | Rippberger | 296/100.18 |
| 5,988,674 | A | 11/1999 | Kimura et al. | 280/730.2 |
| 6,003,938 | A | 12/1999 | Lachat et al. | 297/216.13 |
| 6,019,387 | A | 2/2000 | Jost | 280/730.2 |
| 6,029,993 | A | 2/2000 | Mueller | 280/730.2 |
| 6,045,151 | A | 4/2000 | Wu | 280/730.2 |
| 6,089,659 | A | 7/2000 | Toyota | 297/228.11 |
| 6,151,926 | A | 11/2000 | Leeke et al. | 66/170 |
| 6,254,122 | B1 | 7/2001 | Wu et al. | 280/730.2 |
| 6,293,580 | B1 | 9/2001 | Lachat et al. | 280/728.3 |
| 6,299,197 | B1 | 10/2001 | Mueller | 280/728.3 |
| 6,309,006 | B1 | 10/2001 | Rippberger | 296/100.16 |
| 6,338,527 | B1 | 1/2002 | Toyota et al. | 297/229 |
| 6,345,866 | B1 | 2/2002 | Jackson et al. | 297/228.12 |
| 6,382,665 | B2 | 5/2002 | Holdampf et al. | 280/730.2 |
| 6,382,720 | B1 | 5/2002 | Franklin et al. | 297/228.13 |
| 6,447,059 | B1 | 9/2002 | Jackson et al. | 297/228.12 |
| 6,523,237 | B1 | 2/2003 | Kopec et al. | 29/91.1 |
| 6,648,410 | B2 | 11/2003 | Sparks | 297/228.12 |
| 6,652,026 | B2 | 11/2003 | Toyota et al. | 297/229 |
| 6,655,735 | B1 * | 12/2003 | Learning | 297/228.1 |
| 6,676,209 | B1 * | 1/2004 | Szabo et al. | 297/228.13 X |
| 6,722,733 | B2 * | 4/2004 | Schmidt et al. | 297/229 |
| 6,764,134 | B1 * | 7/2004 | Crescenzi et al. | 297/228.1 X |
| 6,786,546 | B2 | 9/2004 | McConnell et al. | 297/219.12 |
| 6,886,479 | B1 | 5/2005 | Hori | 112/475.06 |
| D506,101 | S | 6/2005 | Rains | D6/611 |
| D506,345 | S | 6/2005 | Bailey et al. | D6/608 |
| D508,184 | S | 8/2005 | Kenny | D6/611 |
| D508,360 | S | 8/2005 | Inman | D6/611 |
| 6,935,699 | B2 | 8/2005 | Biermann | 297/452.64 |
| 7,000,984 | B1 | 2/2006 | Ward | 297/228.12 |
| 7,004,496 | B2 | 2/2006 | Bossecker et al. | 280/703.2 |
| 7,029,025 | B2 | 4/2006 | Schwark et al. | 280/728.3 |
| 7,172,246 | B1 | 2/2007 | Itakura | 297/219.1 |
| 7,178,826 | B2 | 2/2007 | Acker et al. | 280/730.2 |
| D538,059 | S | 3/2007 | Knorpp | D6/406.3 |
| D538,574 | S | 3/2007 | Eskandry | D6/611 |
| 7,287,813 | B2 | 10/2007 | Aliev | 297/219.1 |
| 7,290,792 | B2 | 11/2007 | Tracht | 280/730.2 |
| 7,337,508 | B2 | 3/2008 | Takasawa et al. | 24/401 |
| 7,374,240 | B2 | 5/2008 | Gold et al. | 297/219.12 |
| 7,380,812 | B2 | 6/2008 | Tracht et al. | 280/728.3 |
| 2002/0125700 | A1 | 9/2002 | Adkisson | 280/733 |
| 2003/0127890 | A1 * | 7/2003 | Moon | 297/228.1 X |
| 2003/0132651 | A1 | 7/2003 | Floriduz | 297/229 |
| 2003/0205921 | A1 | 11/2003 | McConnell et al. | 297/256.16 |
| 2003/0227212 | A1 | 12/2003 | Biermann | 297/452.58 |
| 2004/0012230 | A1 | 1/2004 | Burge | 296/209 |
| 2004/0189067 | A1 | 9/2004 | McConnell et al. | 297/219.1 |
| 2005/0037682 | A1 | 2/2005 | Taylor et al. | 442/304 |
| 2005/0140192 | A1 | 6/2005 | Hanks | 297/219.1 |
| 2005/0258624 | A1 | 11/2005 | Abraham et al. | 280/728.3 |
| 2006/0000065 | A1 | 1/2006 | Takasawa et al. | 24/401 |
| 2006/0185568 | A1 | 8/2006 | Kuttner et al. | 112/475.02 |
| 2007/0040426 | A1 | 2/2007 | Kenny | 297/229 |
| 2007/0085308 | A1 | 4/2007 | Tracht et al. | 280/730.2 |
| 2007/0138774 | A1 | 6/2007 | Klima et al. | 280/730.2 |
| 2007/0170759 | A1 | 7/2007 | Nolan et al. | 297/250.1 |
| 2007/0182131 | A1 | 8/2007 | Helbig et al. | 280/728.2 |
| 2007/0210627 | A1 | 9/2007 | McConnell et al. | 297/224 |
| 2007/0262624 | A1 | 11/2007 | Snedeker | 297/219.1 |
| 2008/0054604 | A1 | 3/2008 | Castro et al. | 280/730.2 |
| 2008/0093900 | A1 | 4/2008 | Gold et al. | 297/219.12 |
| 2008/0100044 | A1 | 5/2008 | Cho | 280/730.2 |
| 2008/0290635 | A1 | 11/2008 | Wieczorek et al. | 280/728.2 |

FOREIGN PATENT DOCUMENTS

| | | | |
|---|---|---|---|
| AT | 406036 | | 2/2000 |
| AT | 503795 | | 1/2008 |
| AT | 503919 | | 2/2008 |
| DE | 29620382 | U1 | 1/1997 |
| DE | 19648529 | C1 | 5/1998 |
| DE | 19727746 | A1 | 1/1999 |
| DE | 10238909 | C1 | 10/2003 |
| DE | 102004023643 | | 12/2004 |
| DE | 102004059277 | | 2/2006 |
| DE | 102004053259 | | 5/2006 |
| DE | 102005042686 | A1 | 3/2007 |
| DE | 102006059303 | | 2/2008 |
| EP | 0860318 | | 8/1998 |
| EP | 0885768 | | 12/1998 |
| EP | 0893301 | A2 | 1/1999 |
| EP | 0903301 | A1 | 3/1999 |
| EP | 0893301 | A3 | 8/1999 |
| EP | 0983895 | A2 | 3/2000 |
| EP | 0983895 | A3 | 2/2001 |
| EP | 1193118 | A2 | 4/2002 |
| EP | 1193118 | A3 | 9/2003 |
| FR | 2760701 | A1 | 9/1998 |
| FR | 2830817 | A1 | 10/2001 |
| FR | 2911821 | | 8/2008 |
| JP | 10085086 | A | 4/1998 |
| JP | 10086783 | A | 4/1998 |
| JP | 10086784 | A | 4/1998 |
| JP | 10119694 | A | 5/1998 |
| JP | 2933907 | B2 | 5/1999 |
| JP | 11240408 | A | 9/1999 |
| JP | 11240409 | A | 9/1999 |
| JP | 11240410 | A | 9/1999 |
| JP | 2000024344 | A | 1/2000 |
| KR | 20050083349 | | 8/2005 |
| WO | WO200179023 | A1 | 10/2001 |
| WO | WO2003020549 | A1 | 3/2003 |
| WO | WO2003035953 | A1 | 5/2003 |
| WO | WO2006029729 | | 3/2006 |
| WO | WO2006097309 | | 9/2006 |
| WO | WO2007076536 | A1 | 7/2007 |
| WO | WO2008000011 | | 1/2008 |
| WO | WO2008019413 | | 2/2008 |
| WO | WO2008095485 | | 8/2008 |

* cited by examiner

VEHICLE SEAT COVER

The present application claims the benefit of pending U.S. Provisional Patent Application Ser. No. 60/704,842 filed Aug. 2, 2005, the entire disclosure of which is hereby incorporated by reference.

FIELD OF THE INVENTION

This invention is related to easily installed seat covers which protect the original upholstery of automobile/truck seats in vehicles. More particularly this invention is related to an improved automobile/truck seat cover that is designed to allow the functionality of the front seat belts and armrests on those automobiles with seat-integrated seat belts and armrests.

BACKGROUND OF THE INVENTION

Removable seat covers for vehicles are extensively used by consumers to protect permanent seat upholstery, provide a more decorative appearance, and/or to hide unattractive or damaged upholstery. They are also useful for reduction of sweating, which typically occurs with leather seats; insulation from certain seat materials, such as vinyl or leather, that are characterized by high heat absorption, making them uncomfortable to sit on when first entering a vehicle during hot weather; and for overall comfort for the user. They are also useful for reducing wear and tear on the interior, and for use in transporting small children and pets who tend to be hard on upholstery.

Many different types of automotive seat covers are commercially available in the marketplace today. These include seat covers for highback seats, lowback seats, and seats with and without headrests. There are also covers for seats with seatbelts mounted on the car frame. Currently there exist seat covers that stretch to conform and those with various mechanisms such as straps with hooks, tails, tubes, and rods as means for attaching a cover to a seat. The materials used to construct seat covers include stretchable fabrics, vinyls and other synthetic materials, as well as sheepskin and wool.

The seat covers of interest with respect to the present invention are those that are designed to be adaptable for most bucket seat designs, sometimes called universal seat covers. D276,288 and D387,604 disclose designs for seat covers for automobile bucket seats. U.S. Pat. Nos. 4,669,779 and 4,676,549 describe one-piece seat covers. U.S. Pat. No. 4,958,886 discloses a so-called universal-fit cover, which is designed to fit both to low-back and high-back bucket seats. U.S. Pat. No. 5,005,901 describes a removable seat cover. U.S. Pat. Nos. 5,403,066 and 5,618,082 describe stretchable terry cloth seat covers. U.S. Pat. Nos. 6,345,866 and 6,447,059 disclose adjustable seat covers for high or low back seats.

No slip-on, easy to install, seat covers have been found in the art of the type which are adaptable to various bucket seat configurations, or universal, which also permit the functionality of seat-integrated seat belts and armrests.

SUMMARY OF THE INVENTION

In accordance with the foregoing, the present invention is an improvement in vehicle seat covers that permits the functionality of the seat belts and armrests on front seats with seat-integrated seat belts and armrests, which comprises:

A vehicle seat cover of a type and size adequate to cover both the front of a vehicle seat and the back of a vehicle seat, characterized by elastic lined pass-through openings in the shoulder and hip regions, connected by a zipper or other means of closure in the fabric between the openings.

The openings may have elastic around the circumference, or can be lined with elastic or stretchable material, or any combination thereof. To allow the auto seat belts to easily and effortlessly pass through the seat cover, the openings lined with elastic, or similar stretchy material, are strategically placed at the shoulder and hip ends with a zipper or zipper-like closure between, where the separator head of the zipper is connected to the opening in the shoulder area and the zipper pull and bottom is connected to the opening in the hip area. Also within the scope of this invention are elastic lined openings on each side panel situated behind the zipper, or alternative closure, which permit pass through of seat-attached armrests as well. Each such elastic opening contains at least one fastener means or fabric tie to close off the unused opening.

The seat cover is adaptable to many variations of front seat designs, with one exception being that it is not designed to function on autos where the seats contain seat-mounted side airbags.

DETAILED DESCRIPTION OF THE INVENTION

The product of the present invention is a seat cover for any vehicle, but is particularly useful for front seats having seat-integrated seat belts, and is designed to permit the functioning of the seat-integrated belts. The invention is particularly applicable to front, bucket-style, or captain's chair style seats. Traditional seat covers, which fit like a sock over the auto seat, hinder the operation of seat-integrated seat belts, because they cover the belt. Such traditional seat covers only fit safely in cars with seat belts that are attached directly to the car frame and not to the car seat. The present invention also provides functionality of armrests attached to the seat by a joint or similar means, where the armrest is likewise facilitated by a stretchable or elastic-lined opening.

Figure 1:
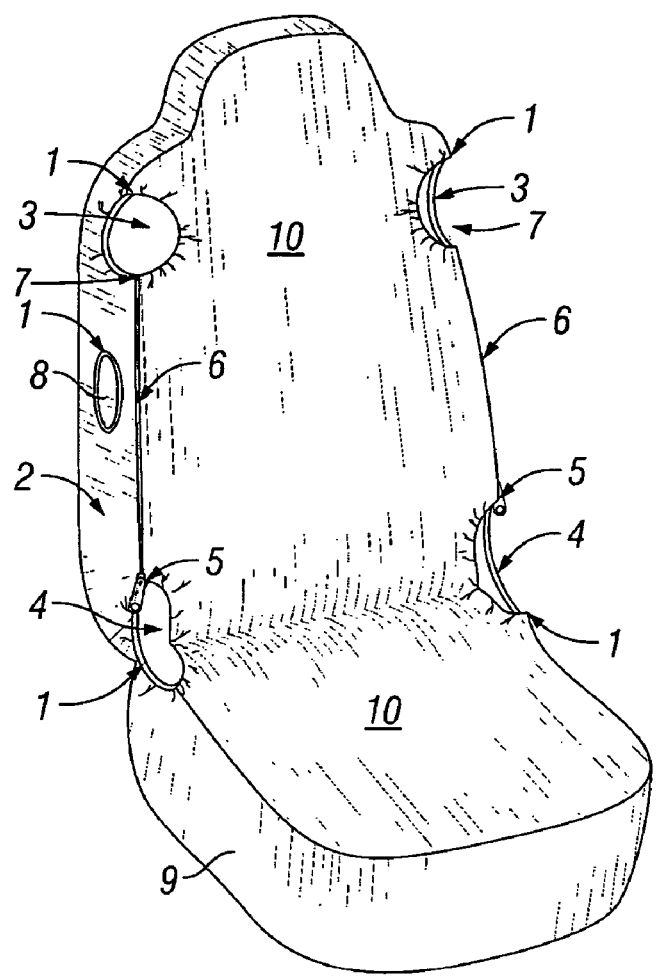
FIG. 1 is a side view of a seat cover for a universal bucket seat.
Figure 3:
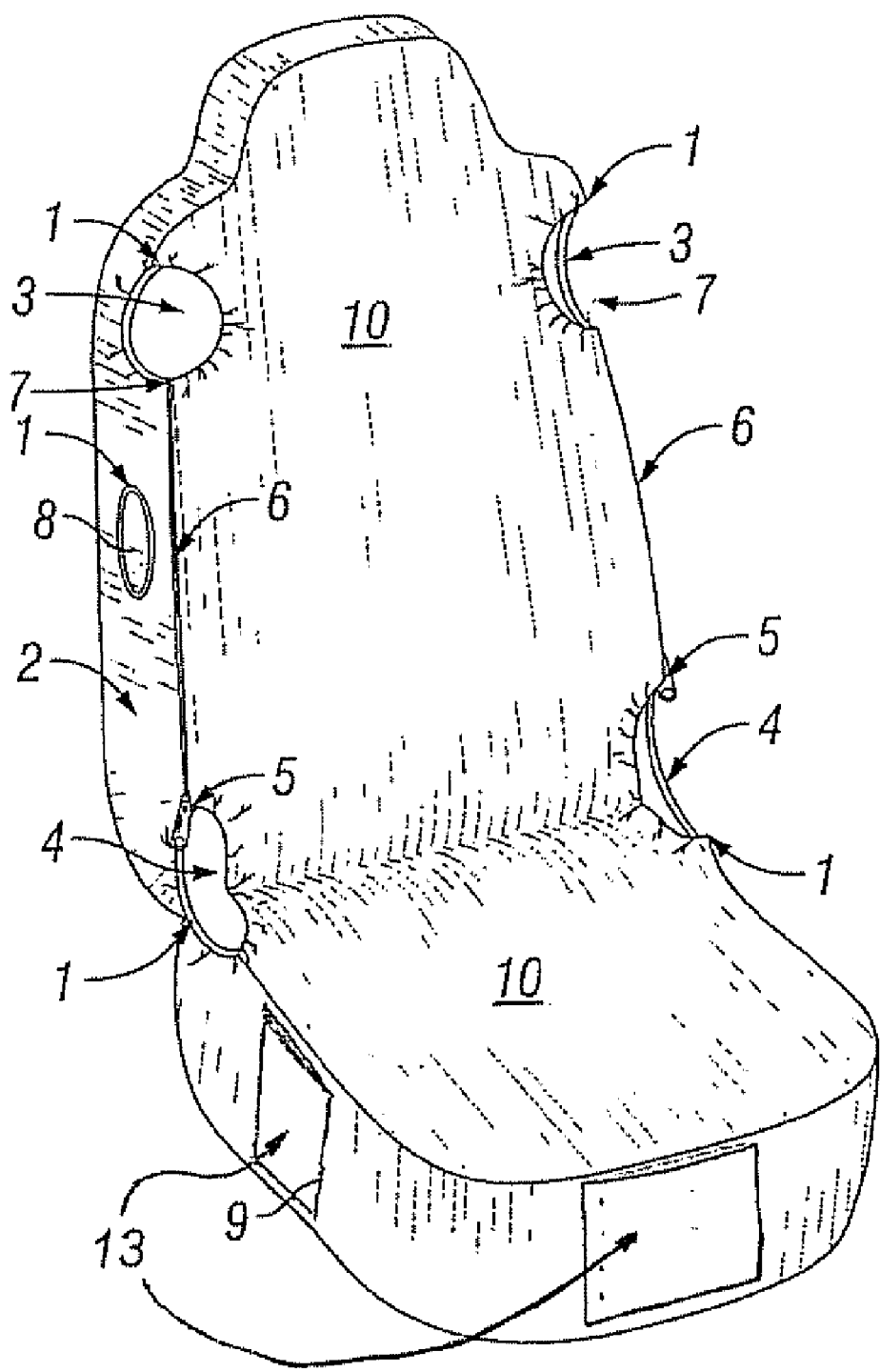

FIG. 1 illustrates one embodiment of the invention. In this embodiment, in order to allow the auto seat belts to easily and effortlessly pass through the seat cover, openings 1 in the fabric on the side panels 2 are lined with elastic, or similar stretchable material, and are strategically placed at the shoulder area 3 and hip area 4. On the front seam of the side panel 2 between the shoulder opening 3 and the hip opening 4 are zippers 6, or an alternative means of closure, where the separating part of the zipper 7 is connected to the shoulder opening and the zipper bottom 5 is located by the to hip opening 4. On the side panel 2 behind the zipper 6 or zipper-like closure is an elastic lined opening 1 for armrest pass-through 8. The entire seat cover including seat bottom and back 10 may be made of the same material/fabric or the side panel of the cover 9 may be constructed of another material. The positioning of the openings is placed as to allow for fairly universal fit, i.e. one size that fits most similarly designed automobile seats. FIG. 3 depicts an embodiment having pockets 13 on the seat cover.

Figure 2:
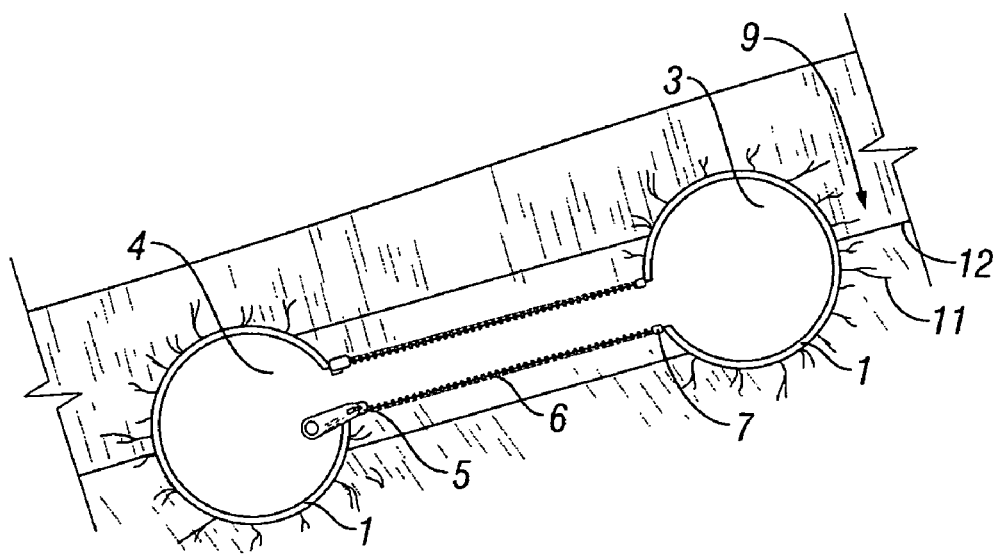
FIG. 2 is a close up view of pass-through openings connected by a zipper.

FIG. 2 is an enlargement of one embodiment of the construction of the pass-through areas. FIG. 2 shows a preferred embodiment comprising a shoulder opening 3 and a hip opening 4, situated on the front seam 12 of the side panel 9 of the top of the seat cover, which seam connects to the front of the seat cover, both comprising elastic-lined openings 1, characterized by a hem around the circumference of the opening with elastic type material running through the hem causing the opening to be normally constricted, but able to expand when the seat belt is passed through. In the alternative elastic type material may also be sewn to the edge of the opening or line the opening. Number 11 shows gathering of fabric around the openings. In this embodiment the material utilized to cause stretch around the circumference of the pass-through openings in the fabric may include, but not be limited to elastic fabric banding or a drawstring arrangement. The drawing in FIG. 2 also shows a zipper 6 wherein the opening of the zipper 7 is connected to the shoulder opening and the foot or closure of the zipper 5 is connected to the hip opening.

Part of the design of the present invention includes separating zippers or other means of closure that can separate at the point where a seat belt attaches to the seat and, when the zipper or other means of closure is separated, allow for the seat belt to be easily pulled out from under the fabric. Closing the zippers while the seat belt is pulled away from the seat, or out from under the fabric, allows for functionality of the seat belt, as the seat cover fabric no longer covers the seat belt. In the embodiment utilizing a zipper or other means of closure, the closure may also be selected from, for example, but not limited to, zipper-like closures, Ziplock® type closures, Velcro® like closures, snaps, magnetic type closures, drawstring, or lacing.

The use of the term "elastic" is intended to mean a property of a material or composite by virtue of which it tends to recover its original size and shape after removal of a force causing deformation. The use of the term "stretchable" is intended to mean a material can be stretched without breaking to about 150% of its initial unstretched length in at least one direction, suitably to about 200% of its initial length and desirably up to 250% of its initial length. The term includes elastic materials 2o as well as materials that stretch but do not significantly retract.

To allow seat-attached arm rests to function, one or more pass-through openings in the fabric are lined with elastic or a similar stretchy material and are strategically placed between the shoulder and hip ends, behind the zipper or zipper-like means. While putting on the seat cover, the user can pass the armrest through this opening and leave the armrest free to function as intended. The positioning of the openings is placed so as to allow for fairly universal fit, i.e. one size fits most similarly designed automobile seats.

Selected material or fabric for the seat cover may be used to construct the entire cover, or may be used for the front side of the cover, 10 in FIG. 1, and supplemental, possibly less expensive, materials may be used for the side panel 9 and/or rear of the cover. Suitable fabrics for use in the seat cover of the present invention include, but are not limited to, cotton and cotton blends, polyester, velour, leatherette, terrycloth, polycotton, knits, denim, cotton/spandex blends, neoprene, wool, orlons, olefins and any to blends thereof. Any print available in these fabrics could be utilized. Said seat cover(s) may or may not include graphical or embroidery style applications or other enhancements of the fabric, such as for example, trims and appliques.

It is also within the scope of the invention to utilize supplemental materials for the side panels 9 and/or rear of the seat cover. Such materials may suitably be expandable or stretchable materials/fabrics. Suitable materials might include, but not be limited to, polyester, nylon, cotton, spandex, knits, Lycra®, mesh, or webbing.

It is also within the scope of this invention for the seat cover to be-lined or backed with a layer that would provide some insulation or cushioning. Suitable materials would include, but not be limited to, foam or polypropylene.

Also within the scope of the present invention are pocket(s) for the purpose of storage. Pockets may be situated in the front lower or seat bottom side of the seat covers, or in the rear backside of the seat cover. The rear back pockets would be easily accessible to auto passengers seated behind the covered seat. Said seat cover(s) or one or more of the pocket(s) may contain odorizing materials or odor-neutralizing materials.

Though the foregoing detailed description of the present invention has been described by reference to several embodiments, and the best mode contemplated for carrying out the present invention has been shown and described herein, it will be understood that modifications and variations in the structure and arrangement of this invention other than those specifically set forth herein may be achieved by those skilled in the art and that such modifications are to be considered as well as being within the overall scope of the present invention.

What is claimed:

1. An improved vehicle seat cover comprising a slip on seat cover of a type and size adequate to cover both the front of a vehicle seat and the back of a vehicle seat, characterized by stretchable lined openings for seat integrated seat belts through which seat-integrated seat belts can be passed, the stretchable lined openings for seat integrated seat belts comprising a shoulder opening and a hip opening, thereby permitting said seat belts to be functional, the seat cover further including stretchable lined openings for seat-integrated armrests, the stretchable lined openings for seat-integrated armrests located on the sides of the seat cover between the shoulder opening and the hip opening and behind means for closure there between.

2. The seat cover of claim 1 wherein the positioning of the stretchable lined openings provides a fit suitable for most similarly designed vehicle seats.

3. A seat cover as described in claim 1 wherein the stretchable lined openings are in the seat cover, which lined openings comprise a material selected from elastic or stretchable material.

4. A seat cover as described in claim 3 wherein the stretchable lined openings for seat-integrated armrests are for the seat-integrated armrests to pass through.

5. A seat cover as described in claim 1 wherein the stretchable lined openings are selected from a hem around the circumference of the opening with an elastic or stretchable material running through said hem to configure the circumference of the opening stretchable, elastic or stretchable material sewn to an edge of the opening, or elastic or stretchable material attached so as to line said opening.

6. A seat cover as described in claim 1 wherein the elastic material comprises elastic banding.

7. A seat cover as described in claim 1 wherein the elastic or stretchable material is selected from the group consisting of cotton, nylon and spandex fibers.

8. A seat cover as described in claim 1 wherein the stretchable lined openings are on the sides of the seat cover, respectively corresponding to a shoulder area and a hip area of the seat cover.

9. A seat cover as described in claim 8 wherein the stretchable lined openings are situated on a seam between front and side panels of the top of the seat cover shoulder area and a hip area and are connected by the means for closure there between.

10. A seat cover as described in claim 9 wherein the means for closure between the stretchable lined openings comprises a zipper.

11. A seat cover as described in claim 9 wherein the means for closure between the stretchable lined openings in the shoulder area and the hip area is selected from the group consisting of zipper means, resealable zip fastening means, hook and loop fastening means, snaps, magnetic means of closure, drawstring, or lacing means for closure.

12. A seat cover as described in claim 1 wherein said seat cover is constructed of a material selected from the group consisting of cotton, cotton blends, polyester, velour, leatherette, terrycloth, polycotton, knits, denim, cotton/spandex blends, neoprene, wool, orlons, olefins, and blends thereof.

13. A seat cover as described in claim 12 wherein the seat cover includes graphical or embroidery style applications.

14. A seat cover as described in claim 12 wherein the seat cover includes other enhancements of the construction material.

15. A seat cover as described in claim 14 wherein the enhancements may include border trim and appliques.

16. A seat cover as described in claim 12 wherein side panels and/or rear of the seat cover is constructed of materials selected from polyester, nylon, spandex, knits, mesh, and webbing.

17. A seat cover as described in claim 12 wherein the seat cover is lined or backed.

18. A seat cover as described in claim 17 wherein the lining is selected from the group consisting of foam and polypropylene.

19. A seat cover as described in claim 12 wherein the seat cover includes pockets.

20. A seat cover as described in claim 19 wherein said pockets are situated in a front lower or seat bottom side of said seat cover.

21. A seat cover as described in claim 19 wherein said pockets are situated in a rear backside of the seat cover.

22. A seat cover as described in claim 19 wherein said pockets are comprised of materials selected from odorizing materials, fragrance materials, and odor-neutralizing materials.

23. An improved vehicle seat cover comprising a slip on seat cover of a type and size adequate to cover both the front of a vehicle seat and the back of a vehicle seat, characterized by stretchable lined openings through which seat-integrated seat belts can be passed, thereby permitting said seat belts to be functional, wherein the stretchable openings are lined openings in the seat cover, which lined openings comprise a material selected from elastic or stretchable material, wherein the seat cover also incorporates stretchable lined openings for seat-integrated armrests to pass through, wherein the stretchable lined openings for seat-integrated armrests are located on the sides of the seat cover between a shoulder opening and a hip opening and behind means for closure there between.

24. A seat cover as described in claim 23 wherein the means for closure separate a side panel of the seat cover from a front of the seat cover.

25. A seat cover as described in claim 23 wherein the means means for closure is located on a front seam of a side panel between the shoulder opening and the hip opening.

26. A seat cover as described in claim 23 wherein the means for closure separate a side panel of the seat cover from a front of the seat cover and wherein the means for closure is located on a front seam of the side panel between the shoulder opening and the hip opening.

27. A seat cover as described in claim 23 wherein the positioning of the stretchable lined openings provides a fit suitable for most similarly designed vehicle seats.

28. A seat cover as described in claim 23 wherein the stretchable lined openings are selected from a hem around the circumference of the opening with an elastic or stretchable material running through said hem to configure the circumference of the opening stretchable, elastic or stretchable material sewn to an edge of the opening, or elastic or stretchable material attached so as to line said opening.

29. A seat cover as described in claim 23 wherein the elastic material comprises elastic banding.

30. A seat cover as described in claim 23 wherein the elastic or stretchable material is selected from the group consisting of cotton, nylon and spandex fibers.

31. A seat cover as described in claim 23 wherein the stretchable lined openings are on the sides of the seat cover, respectively corresponding to a shoulder area and a hip area of the seat cover.

32. A seat cover as described in claim 31 wherein the stretchable lined openings are situated on a seam between front and side panels of the top of the seat cover shoulder area and hip area and are connected by the means for closure there between.

33. A seat cover as described in claim 32 wherein the means for closure between the stretchable lined openings comprises a zipper.

34. A seat cover as described in claim 32 wherein the means for closure between the stretchable lined openings in the shoulder area and the hip area of the seat cover is selected from the group consisting of zipper means, resealable zip fastening means, hook and loop fastening means, snaps, magnetic means for closure, drawstring, or lacing means for closure.

35. A seat cover as described in claim 23 wherein said seat cover is constructed of a material selected from the group consisting of cotton, cotton blends, polyester, velour, leatherette, terrycloth, polycotton, knits, denim, cotton/spandex blends, neoprene, wool, orlons, olefins, and blends thereof.

36. A seat cover as described in claim 35 wherein the seat cover includes graphical or embroidery style applications.

37. A seat cover as described in claim 35 wherein the seat cover includes other enhancements of the construction material.

38. A seat cover as described in claim 37 wherein the enhancements may include border trim and appliques.

39. A seat cover as described in claim 35 wherein side panels and/or rear of the seat cover is constructed of materials selected from polyester, nylon, spandex, knits, mesh, and webbing.

40. A seat cover as described in claim 35 wherein the seat cover is lined or backed.

41. A seat cover as described in claim 40 wherein the lining is selected from the group consisting of foam and polypropylene.

42. A seat cover as described in claim 35 wherein the seat cover includes pockets.

43. A seat cover as described in claim 42 wherein said pockets are situated on a front lower or seat bottom side of said seat cover.

44. A seat cover as described in claim 42 wherein said pockets are situated on a rear backside of the seat cover.

45. A seat cover as described in claim 42 wherein said pockets are comprised of materials selected from odorizing materials, fragrance materials, and odor-neutralizing materials.

46. A seat cover as described in claim 1 wherein the means for closure separate a side panel of the seat cover from a front of the seat cover.

47. A seat cover as described in claim 1 wherein the means for closure is located on a front seam of a side panel between the shoulder opening and the hip opening.

48. A seat cover as described in claim 1 wherein the means for closure separate a side panel of the seat cover from a front of the seat cover and wherein the means for closure is located on a front seam of the side panel between the shoulder opening and the hip opening.

* * * * *